Oct. 20, 1936.  C. MacCALLUM  2,058,026
SEPARATING APPARATUS
Filed Dec. 24, 1932   3 Sheets-Sheet 3
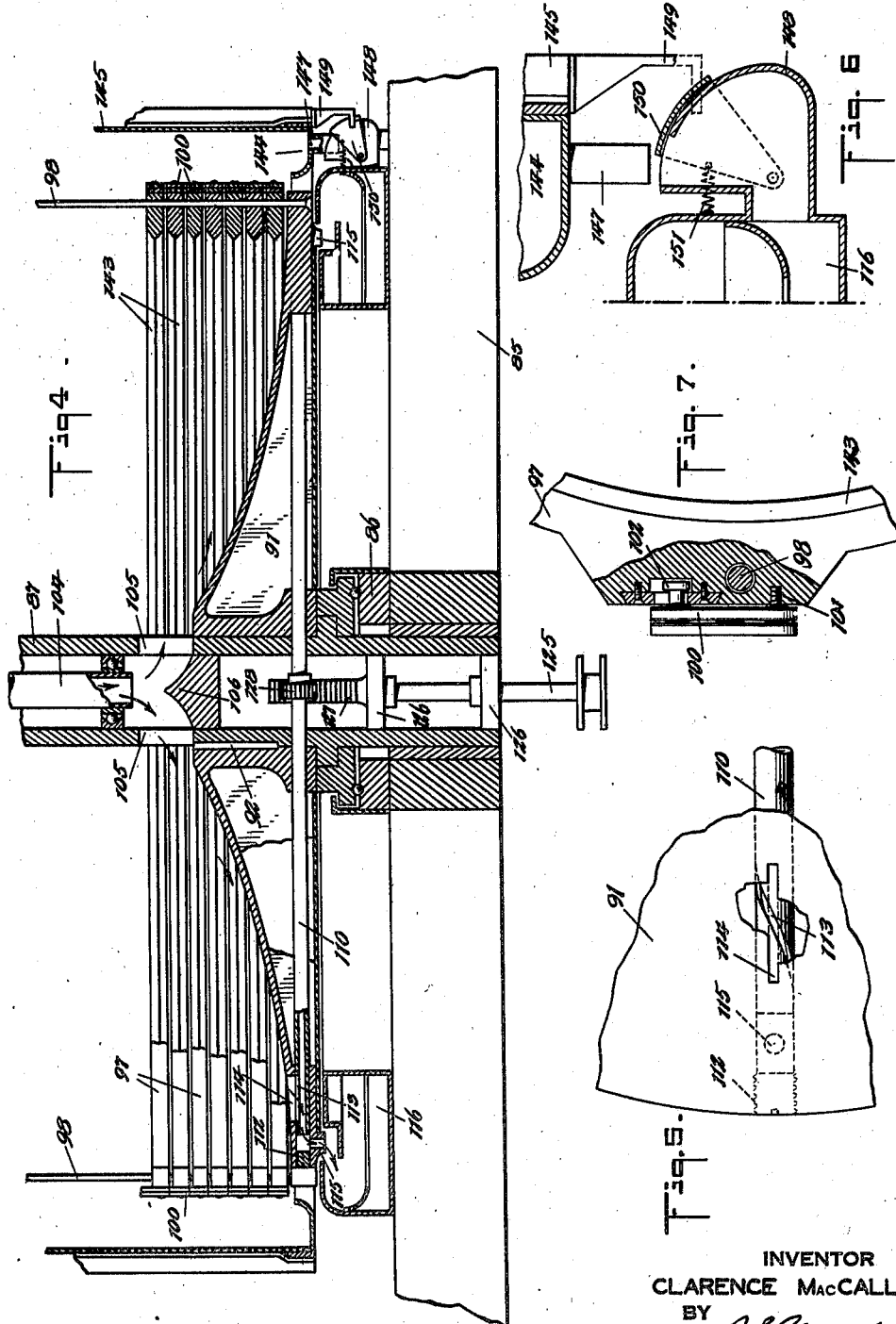
INVENTOR
CLARENCE MacCALLUM
BY
ATTORNEY

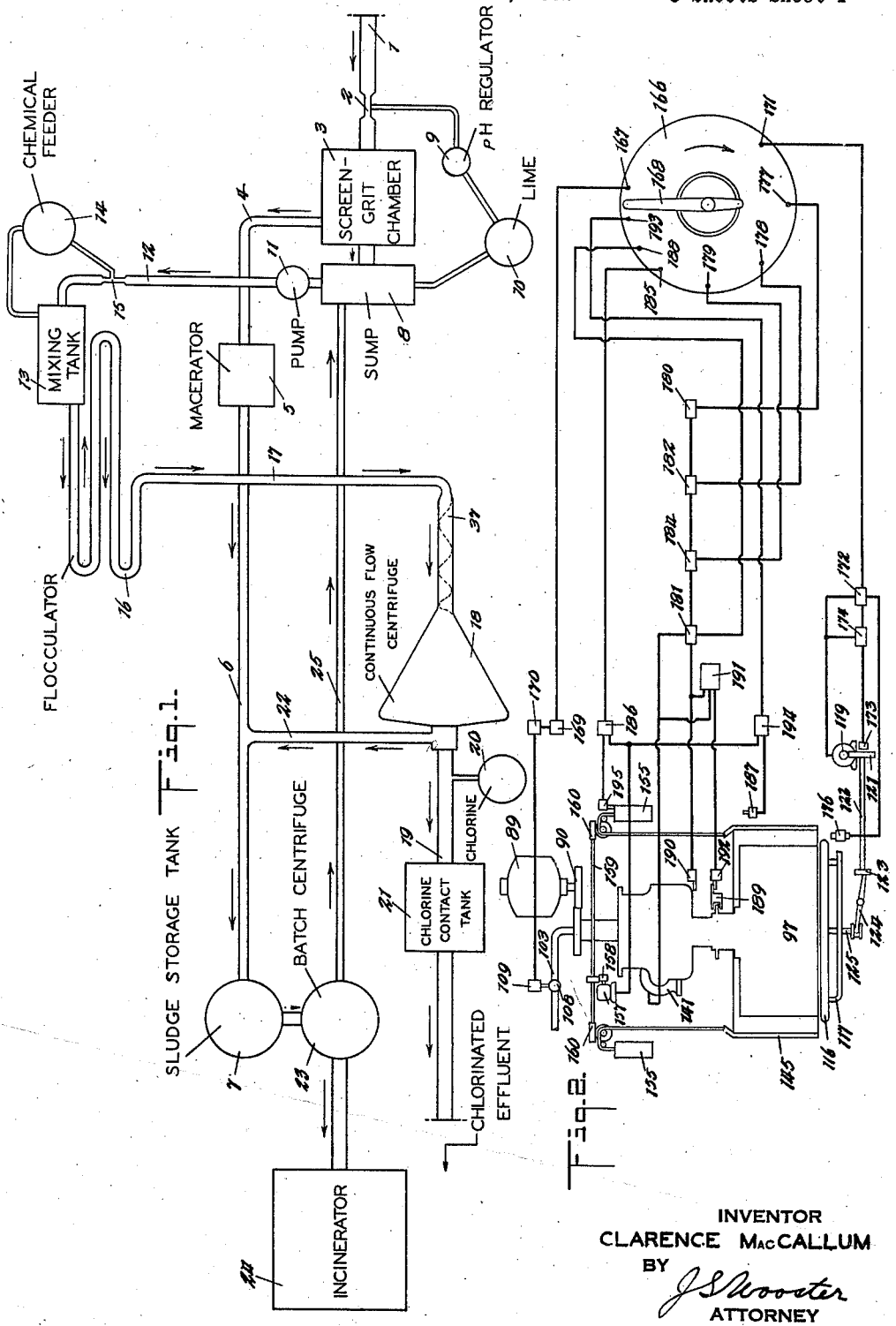

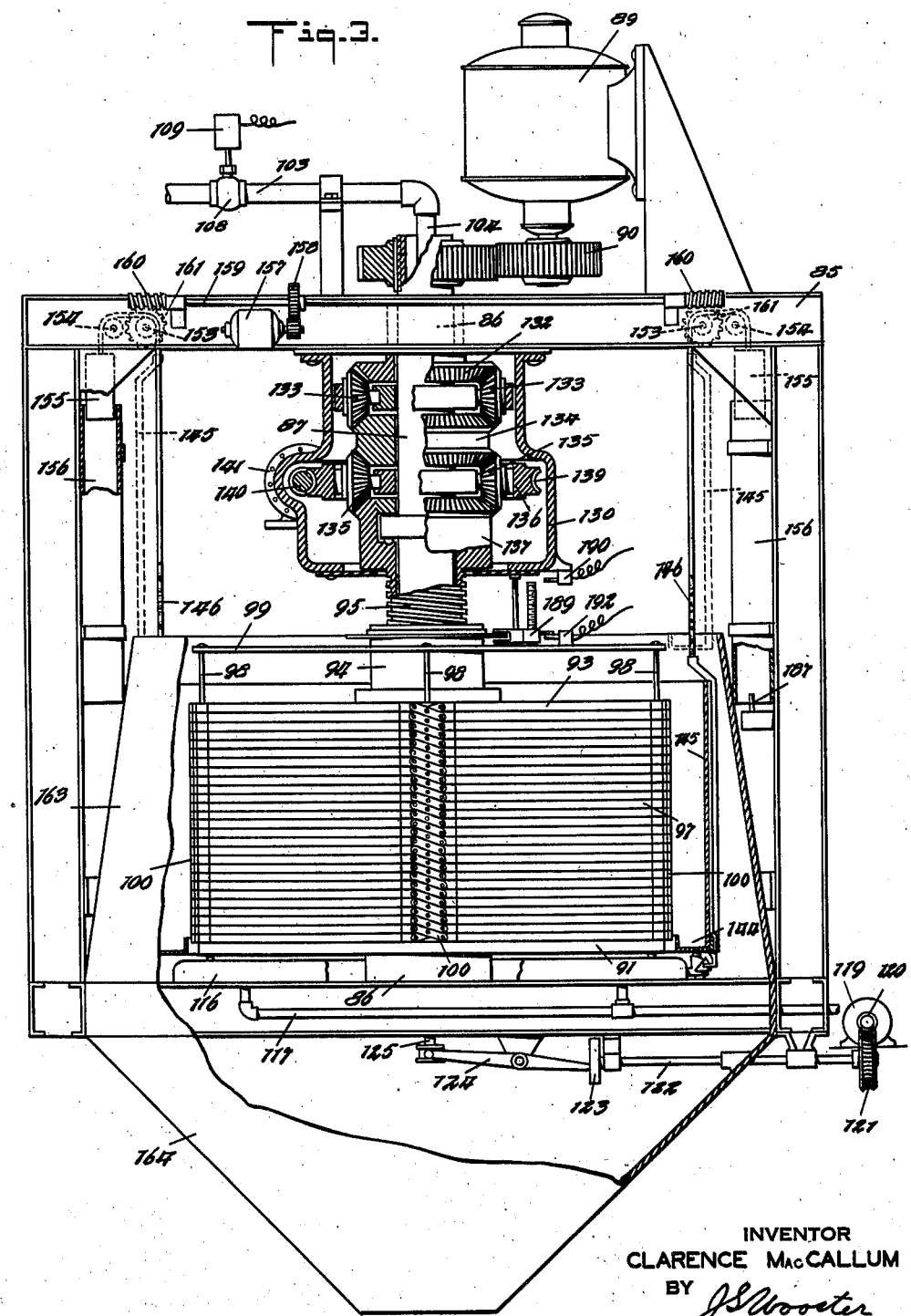

Patented Oct. 20, 1936

2,058,026

UNITED STATES PATENT OFFICE 2,058,026

SEPARATING APPARATUS

Clarence MacCallum, Port Washington, N. Y.

Application December 24, 1932, Serial No. 648,771

23 Claims. (Cl. 209—303)

This invention relates to method and apparatus for separating materials having different physical characteristics, particularly those which differ in density, and has for its object to effect a more thorough and more rapid separation of such materials than is attainable with previously known methods and apparatus.

Another object of the invention is to separate liquids from solids of various sizes and densities by continuous treatment in a centrifugal machine or combination of such machines without supervision of loading, unloading or any other operation from the time the treatment begins until final separation is effected.

My invention is useful in any situation where it is desired to separate materials of different densities (specific gravities) or sizes and is particularly applicable to the treatment of materials which because of their nature or composition or for other reasons are difficult to separate efficiently and economically by screening or filtration or by previously known or used methods of centrifuging.

One example of its use is in the separation of liquids from free-flowing solids, as in the processing of raw sugar where it is customary to drain the mother liquor or molasses through rotating baskets or screens which contain as many as six hundred perforations to the inch. It is possible with such screens to separate ninety-six percent of the sugar from the liquid but it is necessary to stop the machine to dig out or discharge the sugar, thereby reducing the capacity of the plant and increasing the cost of production. My invention provides a novel centrifugal machine which is economical to install, which may be operated automatically and without supervision and is capable of effecting a more thorough separation of materials than previous machines in situations of the type referred to.

The machine consists essentially of a rotatable basket constructed in separable sections which fit together in sealing contact to hold the materials to be centrifuged and are adapted to be spread apart and held in a plurality of stages of separation to discharge materials selectively at different times. The machine which I shall use to illustrate the invention has an upright basket comprising horizontal rotatable heads, a multiplicity of circular sections or rings stacked on the bottom head and fitting together in sealing contact simulating a solid wall basket, and means for uniformly separating said rings anywhere from several thousandths of an inch more or less so that only liquids can pass through the cracks, up to much greater distances according to the nature of the materials to be separated. I do not, however, limit myself to this particular embodiment of the invention since the basket may be made of separable vertical slats or sections or may be constructed and mounted in other ways.

The materials, for example liquids and fine and coarse solids, are admitted to the basket while it is rotating and the solids are precipitated to the inner periphery. The freed liquids inwardly of the periphery may be drained off through the bottom head as hereinafter described. The sections or rings are then simultaneously cracked apart slightly, a few thousandths of an inch more or less, by a separating force as by means of a differential screw jack acting on the top head and thence through suitable connecting links on all the rings, and the liquids are discharged through the cracks by centrifugal force. Further gradual separation of the rings results in discharging additional liquids and, when the solids are sufficiently dried, the rings are spread apart far enough to discharge the solids by centrifugal force. The inner peripheral edges of the rings are preferably tapered outwardly toward the adjacent rings in order to provide maximum draining areas and to direct the materials outwardly when said rings are separated.

It is necessary to remove the materials such as liquids which are first discharged from the basket in order to prevent remixing with the materials of different density which are subsequently discharged and this may be accomplished in several ways. In the case of an upright basket I prefer to discharge the liquids into a vertically movable shell or apron surrounding the basket and adapted to conduct away the liquids as received. When the liquids have been discharged the apron is raised above the basket and the solids are preferably discharged against an outer stationary receptacle from which they are conveyed in any suitable manner. The solids may be discharged all at one time or in separate stages according to size, depending upon the particular separation required. Other important features of the machine include means for maintaining the sections or rings of the basket in axial or peripheral alignment parallel to the head, means for charging the basket with successive batches of materials, and means for performing all operations automatically and in predetermined sequence in accordance with definite recurring time cycles.

There are numerous situations where it is desirable to remove excess liquids from solids before processing in the centrifuge referred to above. One such case is in the disposal of raw sewage which contains up to 99.96 percent water, the problem being to reduce the water content to a point where the solids may be incinerated economically. A disposal plant serving a large city may receive a continuous flow of sewage measured in millons of gallons per day and a considerable saving in plant equipment and operating costs may be realized by removing as much water as possible from the incoming stream of sewage before processing the residual sludge in the batch-type centrifuge described above. To obtain maximum efficiency in cases of this kind I prefer to use one or more of my batch-type machines preceded by any suitable apparatus which will remove a large quantity of liquid from the stream before processing the sludge in the machine of this invention. For purposes of illustration I shall describe the invention as applied to a sewage disposal system of the type referred to above although it is obviously not limited to such a system or to the specific details of construction or methods of operation herein disclosed.

In the annexed drawings:

Fig. 1 is a diagrammatic illustration of a sewage disposal plant embodying the invention;

Fig. 2 is a diagram of the electrical circuits controlling the batch centrifuge which is shown in detail in Figs. 3 to 7;

Fig. 3 is a vertical section through the continuously operated batch centrifuge;

Fig. 4 is an enlarged vertical section through the lower end of Fig. 3, showing the interior of the basket and associated parts with the sections slightly separated;

Fig. 5 is a fragmentary plan view of the bottom head of the basket, showing means for draining off the lighter materials or liquids;

Fig. 6 is an enlarged sectional view showing means for removing liquids as discharged from the basket; and Fig. 7 is a fragmentary sectional view showing the connections between the separable sections of the basket.

In Fig. 1 raw sewage enters the disposal plant through pipe 1, passing through Venturi tube 2 into screen and grit chamber 3 which may be of any suitable construction having screens or other means for removing rags, sticks and other large and small solids which might tend to clog a centrifugal separator.

Coarse and fine screenings from chamber 3 pass through pipe 4 into macerator 5 where they are reduced to any desired size and conveyed through pipe 6 into sludge storage tank 7. The liquid and other raw sewage passes into sump or pit 8 where it is preferably neutralized by means of automatic pH regulator 9 connected to Venturi tube 2 and controlling admission of lime from supply tank 10 to sump 8.

From sump 8 the sewage is raised by pump 11 through pipe 12 into chemical mixing tank 13 where it is treated with suitable chemicals adapted to create a floc in the sewage. The chemicals are supplied to tank 13 automatically by feeder 14 controlled by Venturi meter 15 the function of which is to control the supply of chemicals in accordance with the quantity of sewage passing through pipe 12. The time of treatment in tank 13 is sufficient to create a floc in the sewage and allow the floc to collect colloidal matter, which action is further promoted by passing the treated sewage by gravity through flocculator 16 and pipe 17 into continuous flow centrifuge 18 where a large percentage of the liquids are separated from the solids. Centrifuge 18 may be of any suitable type.

The materials are fed to this machine through a stationary pipe section containing helicoid 37 having convolutions which gradually decrease in pitch as they approach the basket and thus whirl the incoming material in the direction of rotation of the basket at a speed approximating that of the basket. This whirling motion prevents breaking up of the floc suspended in the incoming material and introduces the material into the machine without destroying the floc.

The effluent from centrifuge 18 passes through pipe 19, to which a predetermined amount of chlorine is admitted from supply tank 20, and is retained in tank 21 in contact with the chlorine for a period of time sufficient to produce sterilization, after which the innocuous chlorinated effluent is discharged into the ground, ocean or any available river or stream, depending upon the locality in which the disposal plant is used. The sludge from centrifuge 18 is conveyed by any suitable conveyor or pump through pipes 22 and 6 into sludge storage tank 7 which also receives the macerated screenings from chamber 3 and macerator 5 as previously described. This material passes from tank 7 into batch centrifuge 23 where the liquid content is reduced to a point sufficiently low to permit economical burning of the sludge in incinerator 24. If desired, the effluent from centrifuge 23 may be returned by pipe 25 to sump 8 for further processing.

The batch type centrifuge 23 of Figs. 3 to 7 operates continuously, separating materials of different densities in successive batches without machine stops. It comprises a frame 85 carrying bearings 86 supporting vertical hollow shaft 87 which is rotated continuously by motor 89 through gears 90 as shown in Fig. 3.

Shaft 87 carries a rotatable basket comprising bottom head 91 fixed to the shaft as by key 92; top head 93 fixed to hub 94 which is loose keyed to shaft 87 to prevent its rotation relative to said shaft and which hub forms part of differential screw jack 95 which is mounted on shaft 87 in a manner hereinafter described; and a side wall formed by a multiplicity of annular plates or rings 97 which are stacked one on top of the other between heads 91 and 93 as shown in Figs. 3 and 4. These rings may be made of drop-forged steel or any other suitable material and are so constructed that they maintain sealing contact with each other and with heads 91 and 93 when held together as shown in the drawings. To maintain alignment of rings 97 with relation to each other and to heads 91 and 93, rods 98 are fastened to bottom head 91 and are carried through aligned clearance holes in each successive ring and through top head 93 to a predetermined distance above the top head where they are fastened to a plate or ring 99. Hence, by raising and lowering top head 93, rings 97 constituting the wall of the basket are permitted to slide up and down on rods 98 in perfect alignment and without danger of eccentric movement throwing any or all of the rings out of place. During such movement equal spacing between rings 97 is maintained by cross links or lazy tongs 100 each having one end pivoted to one ring as by screw or rivet 101 and the other end secured to a sliding pivot such as 102 in the peripheral edge of the next adjacent ring. Links 100 are in the path of material discharged from the basket, as will be apparent from the ensuing description, and their inner edges are preferably rounded to avoid catching or retaining any of said material. The particular machine shown in the drawings has four sets of lazy tongs 100 and four vertical rods 98 but any other suitable number and arrangement of such parts may be employed depending upon the size and speed of the machine.

The materials to be centrifuged are admitted to the machine through feed line 103 connected to pipe 104 which extends through hollow shaft 87 and has its lower outlet end adjacent openings 105 in said shaft. The interior of the shaft adjacent openings 105 is shaped as at 106 to direct the material into the basket on opposite sides of said shaft. In order to insure that the correct amount of material is admitted to the machine in each successive batch, feed line 103 contains valve 108 which may be operated manually or by any suitable automatic means such as solenoid 109. While the machine may be used in any situation where it is desired to separate materials of different densities, it will be assumed for purposes of illustration that feed line 103 is connected to sludge storage tank 7 in the disposal system of Fig. 1.

During the charging operation, and for a predetermined period of time thereafter, basket rings 97 are pressed together in sealing contact and form a continuous unbroken wall through which nothing can escape. The basket rotates continuously, precipitating the heavier materials to the outer ringed wall and the lighter material or liquid to the central portion of the basket inwardly of the heavier materials. The separated liquids are withdrawn through rotatable pipe 110 which extends through bottom head 91 and shaft 87, being inserted through an opening in head 91 which is subsequently sealed by packing gland 112. Adjacent its ends pipe 110 has diagonal slots 113 in one side directly beneath straight slots 114 formed in bottom head 91 so that, as pipe 110 rotates, slots 113 will communicate with slots 114 at points nearer to or farther away from the periphery of bottom head 91 as shown in Fig. 5. The ends of pipe 110 are open and hence, when slots 113 communicate with slots 114, liquid will flow through said slots into pipe 110 and thence through the ends of said pipe and outlet openings 115 in the bottom of head 91 into stationary annular pan 116 as shown in Fig. 4. The liquids are conducted away from pan 116 by pipe 117 which may be connected to return pipe 25 in the disposal plant of Fig. 1.

Pipe 110 is rotated by motor 119 through worm 120, worm gear 121, shaft 122, cam 123 and lever 124 actuating vertical rod 125 which is mounted in bearings 126 in hollow shaft 87 and carries rack 127 meshing with pinion 128 keyed to pipe 110 as shown in Figs. 3 and 4. Motor 119 may be operated in any suitable manner, for example by the automatic timing system of Fig. 2 which controls all operations of the machine in accordance with definite recurring time cycles as hereinafter described.

To further separate the liquids from the solids I provide for micrometer adjustment of basket rings 97 by means of a train of gears operating differential screw jack 95 as shown in Fig. 3. The said gears are preferably housed in an oil-tight gear box 130 adapted to contain lubricating oil and comprise bevel gear 132 which is keyed to vertical shaft 87 and is driven thereby; idler gears 133 mounted in the gear box and driven by gear 132; double-faced idler gear 134 loosely mounted on shaft 87 and driven by idler gears 133; floating gears 135 mounted on ring 136 and driven by gear 134; and gear 137 carried by screw jack 95 and driven by gears 135 in the same direction as shaft 87. Ring 136, in addition to carrying gears 135, also carries worm gear 139 meshing with worm 140 which is adapted to be driven by reversible motor 141. Hence, rotation of worm 140 in one direction accelerates the speed of rotation of gear 137 and screw jack 95 with respect to shaft 87 and hub 94, thereby raising hub 94 and top head 93 of the basket and permitting rings 97 to rise and spread apart predetermined uniform distances under control of cross-links or lazy tongs 100 as shown in Fig. 4. Subsequent rotation of worm 140 in the opposite direction retards the speed of rotation of gear 137 and screw jack 95 and packs rings 97 together again as shown in Fig. 3.

By proper operation of motor 141, as by means of the automatic control system hereinafter described, rings 97 may be uniformly "cracked" or spread apart several thousandths of an inch or less, permitting a much finer separation of liquids and retention of a much greater percentage of solids than would be possible with any known type of solid or perforated wall basket. This construction also permits any desired number of different adjustments or stages of separation up to a maximum spacing of, say, one-quarter inch between adjacent rings which for most purposes will be sufficient to expel the solids by centrifugal force after the maximum amount of liquids have been withdrawn. Of course any other maximum spacing may be provided for as required.

Assume now that rings 97 are spaced apart a few thousandths of an inch for the purpose of separating out the liquids not previously expelled through pipe 110 in the bottom of the basket. The wet solids have accumulated about the inner peripheral surface of the basket and the liquids will be thrown outwardly and through the cracks between rings 97. The inner edges of rings 97 are preferably V-shaped or beveled at an angle of about 45° as indicated at 143 to convey the liquids more readily to the annular cracks between the rings while retaining the solids behind.

The liquids thus thrown out of the basket are caught in the annular trough or floor 144 of shell or apron 145 which surrounds the basket as shown in Figs. 3 and 4. Apron 145 does not rotate but is capable of being raised by chains 146 to a point above the top of the basket as indicated in dotted lines in Fig. 3. When the apron is in its lower limiting position, as shown in full lines in Figs. 3 and 4, it catches the liquids ejected from the basket and permits them to drain through pipe 147 into extension 148 of pan 116 from which pan they are conducted away by pipe 117. When apron 145 is lowered into draining position, depending arm 149 carried by said apron engages pivoted cover 150 of pan extension 148, opening said cover and admitting pipe 147 which assumes the position shown in Fig. 4; and when the apron is raised, arm 149 disengages cover 150 which swings up under tension of spring 151 and closes the entrance to pan extension 148 as illustrated in Fig. 6, thus preventing mixture of solids and liquids.

When the maximum amount of liquids is removed from the solids in the basket as described above, apron 145 is raised either manually or automatically to the dotted line position above the uppermost ring 97 as shown in Fig. 3. This is preferably accomplished by means of chains 146 which pass over sprocket wheels 153 and pulleys 154 and are provided with counterweights 155 acting in vertical guides 156 which enable the apron to be raised and lowered without swaying or interfering with the revolving parts. Sprocket wheels 153 are operated by reversible motor 157 through gears 158, shaft 159, worms 160 and worm gears 161 secured to the same shaft as sprocket wheels 153. Motor 157 is energized to raise apron 145 at a predetermined time in the cycle of automatic operations, as hereinafter described, after which motor 141 operates screw jack 95 to effect the desired maximum separation of rings 97 to expel the solids from the basket.

The solids contained within the basket are now ejected by centrifugal force against outer shell 163 which is secured to frame 85 and has a conical bottom wall 164 upon which the solids drop by gravity and from which they are conveyed to incinerator 24 of Fig. 1 or are otherwise disposed of. Since cover 150 of liquid pan 116 is now closed it is impossible for the solids to enter or clog the liquid passages. Motor 141 is next reversed, forcing rings 97 of the basket together again, and motor 157 is operated in a direction to lower apron 145 after which the machine is ready for the next batch.

The machine described above and illustrated in Figs. 3 to 7 may obviously be used in many different situations for separating a great variety of materials of different densities and in some cases it may be desirable to control or initiate some or even all operations by hand while in other cases it may be desirable to perform all operations automatically in predetermined time cycles without any machine stops or any supervision of loading, unloading or any of the other functions described above. A system of full automatic time control is illustrated in Fig. 2, it being understood that all time periods are determined in advance and depend upon the nature of the materials to be treated. It is also to be understood that all the automatic operations hereinafter described may be performed electrically, hydraulically or in any other suitable manner, an electrical control system being shown simply for purposes of illustration.

The system of Fig. 2 is functioned by a control member or rotary time switch 166 having a plurality of electrical contacts 167, etc., spaced predetermined distances apart and a contact arm 168 driven by a synchronous motor and connected to any suitable source of current (not shown). Time switch 166 operates continuously, as does motor 89 which drives the ring-walled basket 97 and is entirely independent of the time switch.

Contact arm 168 of time switch 166 rotates in a clockwise direction as viewed in Fig. 2 and first engages contact 167, thus energizing relay 169 which is of any suitable type adapted to remain operated for a definite time period. Relay 169 thereupon operates contactor 170 which energizes solenoid 109, opening valve 108 and admitting the materials to be separated through pipe 104 into the interior of the basket. After a definite time interval, during which a predetermined measured amount of material is admitted to the basket, relay 169 releases, deenergizing contactor 170 and solenoid 109 and thereby closing valve 108.

The fully charged basket continues to rotate, precipitating the solids to the inner peripheries of rings 97 and the liquids to the central portion of the basket, until, after a definite time period has elapsed, contact arm 168 engages contact 171 thereby operating contactor 172 which completes an energizing circuit of motor 119. This motor is geared to rotate liquid discharge pipe 110 at any desired speed, rotating diagonal slots 113 across straight slots 114 in bottom head 91 of the basket and allowing the liquid to drain off as previously described. When worm gear 121 completes a half turn it closes limit switch 173, deenergizing contactor 172 and energizing contactor 174 which reverses the direction of rotation of motor 119. Discharge pipe 110 now rotates in the opposite direction, diagonal slots 113 retracing their path adjacent straight slots 114 while the liquid continues to drain through pipe 110 and pan 116 from which it is discharged through pipe 117. Limit switch 173 continues to reverse the direction of rotation of pipe 110 until substantially all of the free liquid is drained off and the free-flowing sludge begins to appear in pipe 110. When this sludge escapes in sufficient quantities it is instantly detected by photo-electric eye 176 which returns contactors 172 and 174 to normal inoperative position with sufficient time delay to insure stopping of motor 119 with pipe 110 in reverse position closing slots 114 so that the flow of material is cut off.

The next three contacts 177, 178 and 179 of time switch 166 control elements operating motor 141 for the purpose of raising and lowering basket rings 97 to discharge the liquids, it being understood that a different number and arrangement of contacts may be employed when it is desired to operate the rings in a different number of stages. Closure of contact 177 energizes relay 180 which remains energized for a predetermined time period and which, during its period of energization, operates contactor 181 which energizes motor 141. The motor operates long enough to rotate screw jack 95 any desired number of turns or a fraction of a turn sufficient to separate each of rings 97 a short distance, say a few thousandths of an inch, which allows the liquids to be expelled through the cracks between the rings while retaining substantially all of the solids in the basket. When the desired separation is effected motor 141 stops although the basket of course continues to rotate while the rings are held in the said separated position.

When sufficient time has elapsed to discharge a substantial part of the liquids and thereby materially reduce the moisture content of the solids which are left behind, contact arm 168 closes contact 178 thus energizing definite time relay 182 which operates contactor 181 as before. Contactor 181 again energizes motor 141 which rotates screw jack 95 another fraction of a turn or several turns, as desired, depending upon the spacing of rings 97 required to effect further separation of liquids from the solids which are already partly dried and will therefore not readily pass between the rings when spread further apart than before. When such predetermined spacing of the rings is effected motor 141 stops.

When sufficient time has elapsed to discharge additional liquids contact arm 168 closes contact 179 thus energizing definite time relay 184 which operates contactor 181 as before. Contactor 181 again energizes motor 141 which rotates screw jack 95 a sufficient distance to permit such maximum adjustment of rings 97 as will discharge most of the remaining liquids without discharging any of the remaining solids. When such predetermined spacing of the rings is effected motor 141 stops.

When sufficient time has elapsed to discharge the maximum amount of liquids in the basket it is necessary to raise apron 145 above rings 97 to enable the solids to be discharged into shell 163. At this time contact arm 168 closes contact 185, operating contactor 186 and thereby energizing motor 157 which rotates in a direction to raise the apron. When the apron reaches the uppermost position shown in dotted lines in Fig. 3, counterweights 155 arrive at the lower limit of their travel and one of these counterweights, for example the right-hand counterweight as viewed in Figs. 2 and 3, closes limit switch 187 which deenergizes contactor 186 and stops motor 157 with apron 145 in raised position.

Shortly after this operation contact arm 168 of time switch 166 closes contact 188 thus energizing contactor 181 which again energizes motor 141. The motor rotates screw jack 95 a sufficient number of turns to spread rings 97 apart the maximum distance required for the discharge of solids into shell 163. Due to the enormous increase in the draining area between the separated rings of the basket the solids are practically all discharged by the time the maximum separation is reached. Accordingly, when screw jack hub 94 reaches its maximum height contact finger 189, carried by said hub 94, closes limit switch 190 which thereupon deenergizes contactor 181 and operates contactor 191 the function of which is to reverse motor 141 and thereby lower screw jack hub 94 and top head 93. In this way rings 97 are again forced tightly together until contact finger 189 closes limit switch 192 which deenergizes contactor 191 and stops the operation of motor 141.

Following this operation contact arm 168 of time switch 166 closes contact 193, thus energizing contactor 194 which operates motor 157 in reverse direction to lower apron 145. When the apron reaches the lower limit of its travel, counterweights 155 reach their maximum height and one of the counterweights closes limit switch 195 which deenergizes contactor 194 and stops motor 157 with the apron in its lowered position.

The parts have now returned to their initial positions ready to receive a fresh batch. Time switch 166 continues to operate in recurring cycles, performing all operations automatically as described above.

It will be evident that numerous changes may be made in the details of construction and methods of operation herein described without departing from the scope and spirit of the invention as defined in the appended claims.

The invention claimed is:

1. A basket for centrifugal separators comprising a plurality of separable sections fitting together to form a solid-wall shell capable of retaining materials to be centrifuged and means for separating said sections uniform distances in progressive stages to discharge materials by centrifugal force at each stage.

2. A basket for centrifugal separators comprising a multiplicity of separable rings fitting together into a unit capable of retaining materials to be centrifuged, means for holding said rings together in sealing contact, and means for separating said rings uniformly and in progressive stages to discharge materials by centrifugal force at each stage.

3. A basket for centrifugal separators comprising a multiplicity of rings fitting together to form a solid-wall shell capable of retaining materials to be centrifuged, means for holding said rings together in sealing contact, means for separating said rings uniform distances and means for holding said rings in a plurality of separated positions ranging from slight cracks for discharging liquids to much greater distances for discharging solids by centrifugal force.

4. A centrifuge comprising a plurality of separable sections fitting together in sealing contact forming a basket adapted to hold materials to be centrifuged, means for rotating said basket, means for separating said sections while rotating and means for holding said sections in a plurality of separated positions to discharge materials selectively by centrifugal force.

5. A centrifuge comprising a plurality of separable sections fitting together and forming a basket adapted to hold materials to be centrifuged, means for rotating said basket, means for holding said sections together in sealing contact, and means operative during rotation of said basket to separate said sections in a plurality of predetermined stages ranging from a few thousandths of an inch for discharging liquids to much greater distances for discharging solids by centrifugal force.

6. A centrifuge comprising a multiplicity of separable circular sections rotatable about a common axis and forming a basket adapted to hold materials to be centrifuged, means for rotating said basket, means for holding said sections together in sealing contact, and means for separating said sections uniformly in a plurality of predetermined stages to discharge said materials selectively by centrifugal force.

7. A centrifuge comprising a multiplicity of separable circular sections rotatable about a common axis and forming a basket adapted to hold materials to be centrifuged, means for rotating said basket, means for holding said sections together in sealing contact, means for separating said sections uniformly first slightly and then more widely to discharge materials of different densities at different times, and a plurality of rods carried by said basket parallel to the axis thereof and passing through said sections adjacent the peripheries thereof to maintain said sections in axial alignment.

8. A centrifuge comprising a multiplicity of separable circular sections rotatable about a common axis and forming a basket adapted to hold materials to be centrifuged, means for rotating said basket, means for holding said sections together in sealing contact, means for moving one end section of said basket toward and away from the other end section, and links connecting each of said sections with the adjacent sections to distribute such relative movements of said end sections uniformly to all of said sections.

9. A centrifuge comprising a horizontal rotatable head, a plurality of vertically separable rings stacked on said head and fitting together in sealing contact forming an upright basket adapted to hold materials to be centrifuged, means for rotating said basket, means for holding said rings together in sealing position, means for progressively separating said rings to a maximum open position, and means for holding said rings in any stage of separation between said sealing position and said maximum open position to discharge materials selectively by centrifugal force.

10. A centrifuge comprising a horizontal rotatable head, a multiplicity of vertically separable rings stacked on said head and fitting together in sealing contact forming an upright basket adapted to hold the materials to be centrifuged, means for rotating said basket, means for separating said rings uniformly, and a plurality of vertical rods carried by said basket and passing through said rings to maintain them in axial alignment parallel to said head.

11. A centrifuge comprising upper and lower horizontal rotatable heads, a plurality of vertically separable rings stacked on said lower head and fitting together in sealing contact forming an upright basket adapted to hold the materials to be centrifuged, means for rotating said basket, means for raising and lowering said upper head, and connections between adjacent rings and heads for simultaneously separating all of said rings uniformly.

12. A centrifuge comprising a vertical rotatable shaft, a horizontal head driven thereby, a plurality of vertically separable rings stacked on said head and fitting together in sealing contact forming an upright basket adapted to hold the materials to be centrifuged, a differential screw jack driven by said shaft, means for rotating said screw jack at differential speeds with respect to said shaft, and means responsive to differential rotation of said screw jack to separate said rings uniformly.

13. A centrifuge comprising a vertical rotatable shaft, upper and lower horizontal heads driven thereby, a multiplicity of vertically separable rings stacked on said lower head and fitting together in sealing contact forming an upright basket adapted to hold the materials to be centrifuged, a differential screw jack driven by said shaft, means for rotating said screw jack at differential speeds with respect to said shaft, means responsive to differential rotation of said screw jack to raise and lower said upper head, and connections between adjacent rings and heads for separating all of said rings uniformly.

14. A centrifuge comprising a vertical rotatable shaft, upper and lower horizontal heads driven thereby, a multiplicity of vertically separable rings stacked on said lower head and fitting together in sealing contact forming an upright basket adapted to hold the materials to be centrifuged, a differential screw jack driven by said shaft, means for rotating said screw jack at differential speeds with respect to said shaft, means responsive to differential rotation of said screw jack to raise and lower said upper head, connections between adjacent rings and heads for separating all of said rings uniformly, and a plurality of vertical rods carried by said basket and passing through said rings to maintain them in axial alignment parallel to said heads.

15. A centrifuge for separating liquids from solids comprising a horizontal rotatable head, a multiplicity of vertically separable rings stacked on said head and fitting together in sealing contact forming an upright basket adapted to hold the materials to be centrifuged, means for admitting said materials to said basket, means for rotating said basket, means for draining liquids from the interior of said basket, and means operative during rotation of said basket to separate said rings uniform distances and in a plurality of stages ranging from slight cracks capable of discharging only liquids to much larger openings capable of discharging denser materials.

16. A centrifuge for separating liquids from solids comprising a horizontal rotatable head, a multiplicity of vertically separable rings stacked on said head and fitting together in sealing contact forming an upright basket adapted to hold the material to be centrifuged, means for admitting said materials to said basket, means for rotating said basket, and means operative during rotation of said basket to separate said rings uniform distances and in a plurality of stages ranging from slight cracks capable of discharging only liquids to much larger openings capable of discharging denser materials.

17. A centrifuge for separating liquids from solids comprising a horizontal rotatable head having a discharge opening in the bottom, a plurality of vertically separable rings stacked on said head and fitting together in sealing contact forming an upright basket adapted to hold the material to be centrifuged, means for admitting said materials to said basket, means for rotating said basket, a rotatable pipe carried by said head in position to close said discharge opening and having a slot in one side adapted to communicate with said discharge opening to discharge liquids during rotation of said pipe, means for rotating said pipe, and means operative during rotation of said basket to separate said rings in a plurality of stages ranging from slight cracks capable of discharging only liquids to much larger openings capable of discharging denser materials.

18. A centrifuge for separating liquids from solids comprising a horizontal rotatable head having an elongated straight discharge opening in the bottom inwardly of the periphery, a plurality of vertically separable rings stacked on said head and fitting together in sealing contact forming an upright basket adapted to hold the material to be centrifuged, means for admitting said materials to said basket, means for rotating said basket, a rotatable pipe carried by said head in position to close said discharge opening and having a diagonal slot in one side adapted to progress along said discharge opening to discharge liquids during rotation of said pipe, means for rotating said pipe, and means operative during rotation of said basket to separate said rings in a plurality of stages ranging from slight cracks capable of discharging only liquids to much larger openings capable of discharging denser materials.

19. A centrifuge for separating liquids from solids comprising a horizontal rotatable head, a multiplicity of vertically separable rings stacked on said head and fitting together in sealing contact forming an upright basket adapted to hold materials to be centrifuged, means for rotating said basket, and means operative during rotation of said basket to separate said rings uniformly in a plurality of stages to discharge first liquids and then solids according to the spacing of said rings.

20. A centrifuge comprising a rotatable shaft, a plurality of connected separable rings driven by said shaft and fitting together in sealing contact forming a basket adapted to hold the materials to be centrifuged, a differential screw jack loosely carried by said shaft and connected to said rings, a train of gears driven by said shaft and driving said screw jack in the same direction and at the same speed as said shaft, and means for progressively varying the relative speed of said gears to rotate said screw jack at differential speeds with respect to said shaft to progressively vary the separation of said rings.

21. A centrifuge comprising a vertical rotatable shaft, a horizontal head driven thereby, a plurality of connected vertically separable rings stacked on said head and fitting together in sealing contact forming an upright basket adapted to hold the materials to be centrifuged, a differential screw jack loosely carried by said shaft and connected to an end ring of said basket, a train of gears driven by said shaft and driving said screw jack in the same direction and at the same speed as said shaft, and means for progressively varying the relative speed of said gears to rotate said screw jack at differential speeds with respect to said shaft to progressively vary the separation of said rings.

22. In a centrifugal machine, a rotatable driving shaft, a driven member loosely carried by said shaft and adapted to be rotated with respect to said shaft, a gear carried by said shaft, an idler gear meshing with said shaft gear, a double-faced gear loosely mounted on said shaft and driven by said idler gear, a floating gear driven by said double-faced gear, a gear carried by said driven member meshing with said floating gear for rotating said member in the same direction as said shaft, and means for rotating said floating gear with respect to said shaft to rotate said driven member at differential speeds with respect to said shaft.

23. In a centrifugal machine, a rotatable driving shaft, a screw jack loosely carried by said shaft and adapted to be rotated with respect to said shaft, a plurality of separable rings connected to said screw jack in axial alignment with said shaft and adapted to be moved toward and away from each other according to the direction of rotation of said screw jack, a gear carried by said shaft, an idler gear meshing with said shaft gear, a double-faced gear loosely mounted on said shaft and driven by said idler gear, a floating gear driven by said double-faced gear, a gear carried by said screw jack meshing with said floating gear for rotating said screw jack and said rings in the same direction as said shaft, and means for rotating said floating gear with respect to said shaft to rotate said screw jack at differential speeds with respect to said shaft to vary the spacing of said rings.

CLARENCE MacCALLUM.